July 25, 1967 C. L. CLAFF ETAL 3,332,746
PULSATILE MEMBRANE OXYGENATOR APPARATUS
Filed March 29, 1963 4 Sheets-Sheet 2

FIG. 2

INVENTORS
CLARENCE LLOYD CLAFF
ARMAND A. CRESCENZI
PETER F. IPPOLITO
BY Kenway, Jenney & Hildreth
ATTORNEYS July 25, 1967   C. L. CLAFF ETAL   3,332,746
PULSATILE MEMBRANE OXYGENATOR APPARATUS
Filed March 29, 1963   4 Sheets-Sheet 3

INVENTORS
CLARENCE LLOYD CLAFF
ARMAND A. CRESCENZI
PETER F. IPPOLITO
BY *Kenway, Jenney & Hildreth*

ATTORNEYS 3,332,746
PULSATILE MEMBRANE OXYGENATOR
APPARATUS
Clarence Lloyd Claff, Randolph, Mass., and Armand A. Crescenzi, Pleasantville, and Peter F. Ippolito, Bronx, N.Y., assignors to Single Cell Research Foundation, Inc., Randolph, Mass., a corporation of Massachusetts
Filed Mar. 29, 1963, Ser. No. 269,018
30 Claims. (Cl. 23—258.5)

Our invention relates to a pulsatile membrane apparatus and in particular to an apparatus for and a method of oxygenating fluids. More particularly our invention concerns a pulsatile extra corporeal membrane blood oxygenator for maintaining cardiorespiratory functions during partial or complete cardiac bypass.

Flat pressed type and improved membrane type oxygenators described in U.S. Patent 3,060,934 have been employed in the past as extra corporeal synthetic organs for approaching human pulmonary functions. These assemblies have generally comprised a plurality of sets containing groove mats, plastic open weave spaces, membrane material, and cover plates. These sets were peripherally sealed and blood passed into the membrane and oxygen outside the membrane with the oxygenation of the blood accomplished by the diffusion of the oxygen through the semi-permeable membrane as the blood was gravity fed or pumped through the membrane envelope. These oxygenators are not fully satisfactory in that there exists a possibility of preferential blood flow paths and of blood channeling. Additionally rapid oxygenation of blood was inhibited by the thickness of the blood film within the membrane, and the stationary fluid boundary layer effect of the blood on the membrane walls. Further these units often fail to provide heat exchange functions so that separate heat exchanges were often necessary to provide oxygenated blood of the proper temperature.

It is, therefore, an object of our invention to provide a pulsatile membrane apparatus which minimizes fluid channeling or preferential flow paths of blood during blood oxygenation. It is also an object of our invention to provide an apparatus which promotes the effect of thinning and filming of blood within the membrane envelope. A further object of our invention is to provide an apparatus for and a method of enhancing the efficient oxygenation of blood by fluid pulsations which promote the diffusion of oxygen into thin blood films and which aids in overcoming stationary blood boundary layer effects which tend to limit diffusion. Other objects of our invention include providing an apparatus which is characterized by a substantial reduction in the amount of blood needed for priming the apparatus thereby reducing the need for a fresh blood supply, a simplified easily cleaned, assembled, and sterilized unit, and an apparatus which also functions as a heat exchanger for controlling the temperature of oxygenation and the temperature of the outgoing arterial blood.

A specific embodiment of our invention in which the objects of our invention are accomplished is described in the following detailed description taken in conjunction with the accompanying drawings in which.

Our membrane oxygenator constructed in accordance with our invention comprises one or a plurality of sealed membrane bags or envelopes fabricated of a relatively thin, gas pervious, blood impervious plastic material inserted between a pair of recessed grooved flat supporting surfaces which rest on a rigid supporting frame characterized by a plurality of horizontal stepped cross bars and through which supporting frames flow a heat exchange fluid. Venous blood is introduced into the membrane envelope and oxygen is permitted to flow in contact with and adjacent to the membrane envelope through the grooves in the supporting surface while the assembly is maintained at a predetermined temperature by the heat exchange fluid in the supporting frame. In one operation the oxygen, or blood and oxygen, is introduced in a pulsed timed manner in or out of phase. For example, the blood and oxygen introduced into our units may be pulsed in an intermittent pretimed flow manner by the use of solenoid flow control valves on both the blood and oxygen supply inlet lines. The timed pulsation of blood and oxygen may occur 180° out of phase, that is in an alternating sequence. As the fluids are pulsed during the flow of the blood through the membrane envelope, the grooved plates are displaced a small lateral vertical distance to the limit permitted by the stepped cross bars.

Pulsing of these fluids permits the creation of very thin blood films within the membrane envelope and aids in overcoming stationary fluid blood boundary layers on the inner envelope walls. Furthermore gaseous pulsation inhibits channeling of the blood within the membrane envelope. Additionally oxygenation of the blood is quite rapid and efficient due to the very thin blood film coupled with the relatively high pressure differences involved between the gaseous oxygen outside the envelope and the liquid blood within the envelope. The creation of a very thin blood film also reduces the blood holdup within the membrane oxygenator giving a blood trapped volume to blood flow ratio as low as one to ten. Thus we have provided an apparatus for and a method of oxygenating fluids, particularly blood, by the pulsation of the fluids on either or both sides of a semipermeable membrane.

Our invention provides for optimum efficient oxygenation conditions since during the relatively high pressure pulse time period of the oxygen the blood film in the membrane envelope is the thinnest while the pressure difference between the oxygen outside the membrane and the partial pressure of the oxygen in the venous blood within the membrane is at a maximum yielding rapid oxygenation with a minimum amount of entrapped blood volume within the oxygenator.

Figure 1:
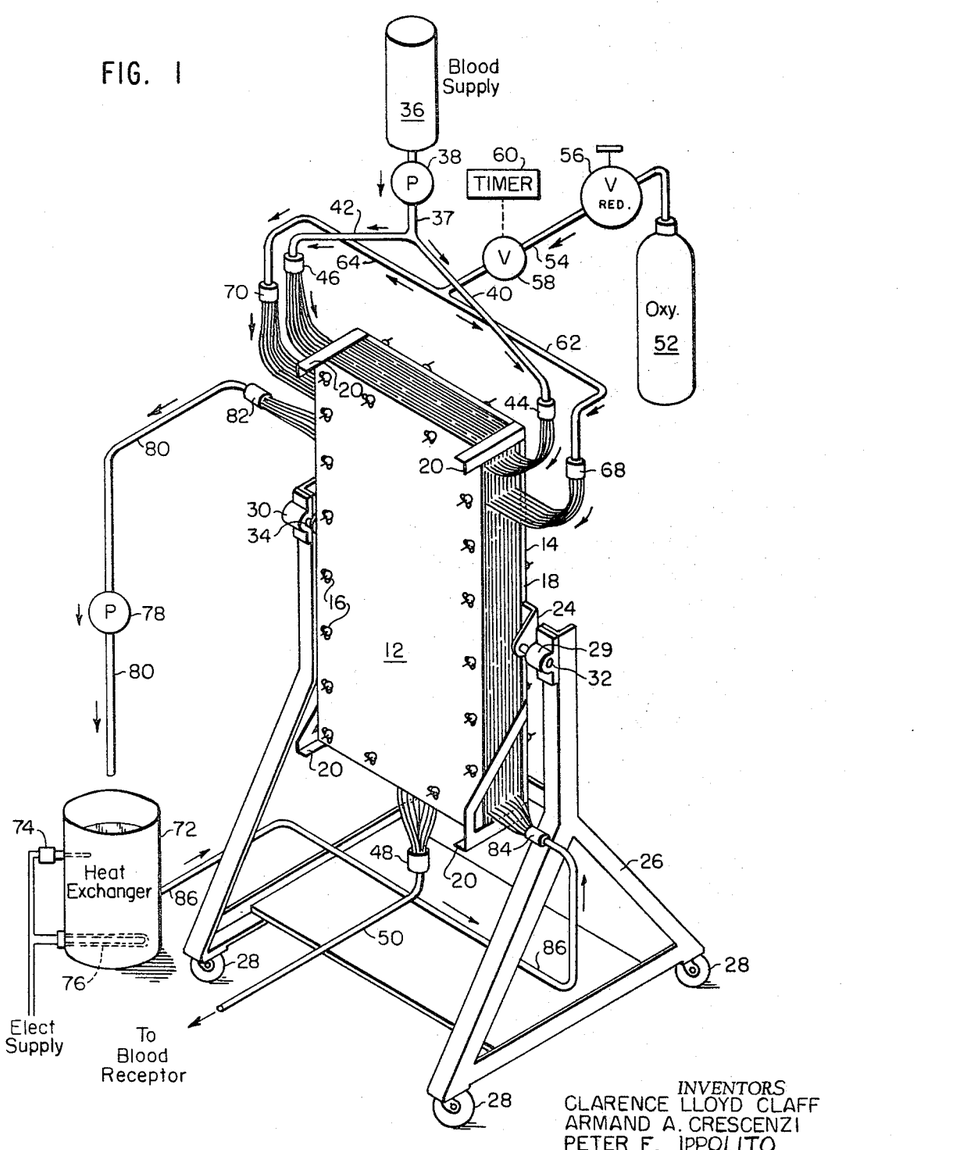
FIG. 1 is a perspective view of a pulsatile membrane blood oxygenator of our invention.

FIGURE 1 shows a multistage membrane oxygenator 10 of our invention which comprises in combination: a plurality of membrane envelopes, groove plates and frame supports in a vertical stacked clamped arrangement between a plain rigid rectangular top 12 and bottom 14 cover plate which plates hold the stacked members in a fluid tight manner by a series of bolts extending through the peripheral edges of each of the stack members and secured by wing nuts. These bolts and wing nuts 16 permit the disassembly and assembly of the plates in a stacked relationship and permit other sets of plates to be added or deleted as desired. The stacked members are supported on a rectangular rigid supporting angle iron frame 18 characterized by having extended right angle corners 20 to hold the members in a firm stacked vertical manner. The supporting frame 18 has center shaft supports 24 on either side of the frame. The frame is supported on a movable inverted Y shaped base 26 having castors 28 with a pair of trunnions 29 and 30 on either side supporting shafts 32 and 34 to permit the rotation and pivoting of the oxygenator stacked members about the lateral shaft axis.

The venous blood is introduced into our oxygenator from a blood supply source 36 through a main blood conduit 37 containing a pulsatile type blood pump such as Davol pump 38 wherein the blood is introduced from a first 40 and a second 42 blood conduit to first 44 and second 46 blood manifolds thence by a series of individual conduits to both sides of individual membrane envelopes. The venous blood supply may be obtained directly from either one of the two main veins or from a separate external blood supply source and introduced by gravity or pumping or as shown by a combination of gravity and a pump. Oxygenated or arterial blood is collected from a series of blood outlet conduits externally extending from the bottom of each individual membrane envelope into an arterial blood manifold 48 thence through a main blood outlet conduit 50 to a blood receptor which may be a sterilized container or directly to the artery of a patient.

An oxygenating fluid such as pressurized gas like air or oxygen is introduced from a pressurized oxygen tank 52 through a main oxygen inlet conduit 54 containing an adjustable pressure reducing valve 56 and a solenoid operated flow control valve 58 which valve is opened and closed in response to electrical impulses received from a timer 60. The pulsed pressurized oxygen is introduced into both sides of the oxygenator through a first 62 and a second 64 oxygen inlet conduit to a first 68 and a second 70 oxygen manifold thence to a series of individual conduits to either side of individual groove plate members.

Oxygenation of the blood may be accomplished at a predetermined temperature by the circulation of a heat exchange fluid through the oxygenator from a heat exchange fluid source 72 having a thermostat 74 set at a predetermined temperature and an electric heating element 76 which is responsive to the thermostat. The heat exchange fluid is introduced through a heat exchange fluid inlet conduit 86 and a first heat exchange manifold 84 thence to a series of individual conduits to each individual supporting frame of the stacked members. To inhibit outward bowing of the cover plates and the stacked members which might be occasioned by the direct inlet pumping of a heat exchange fluid upwardly through the supporting frame members hereinafter described, it is preferred that the heat exchange fluid be introduced at the bottom of our oxygenator and withdrawn at the top thereof, that is in a counterflow manner to the flow path of the blood within the oxygenator. This may be accomplished by the use of a siphon arrangement, or as shown by the use of a pump 78 in a heat exchange outlet conduit 80 and one end of which discharges to the circulating source 72 and the other end containing a heat exchange outlet manifold 82 with individual conduits to the upper portion of each individual frame member. The suction side of the pump 78 is disposed to draw the blood upwardly and through the open area and stepped cross bars within the supporting frame members and thus minimize heat exchange fluid pressure within the stacked oxygenator.

As described the oxygenator provides for the cyclic predetermined timed pulsation of the oxygen between a relatively high and a relatively low pressure, and the pulsation of the blood flow by the peristaltic action of the Davol pump. The blood and oxygen are introduced into the oxygenator at the top with the stacked members in a vertical position as shown, while the heat exchange fluid is introduced in a counterflow direction from that of the blood and oxygen through the use of negative pressures in the heat exchange outlet conduit. Our oxygenator is movable and may be tilted at any desired angular inclination such as to provide for the gravity flow of blood through the oxygenator or to aid in removing entrapped air at the start of the blood oxygenation operation. The stacked members are also readily disassembled for cleaning and sterilization. The conduit members employed are commonly of plastic or rubber tubing which is readily available with the individual conduits from the manifolds of the individual plate members being of similar but smaller diameter material.

Figure 2:
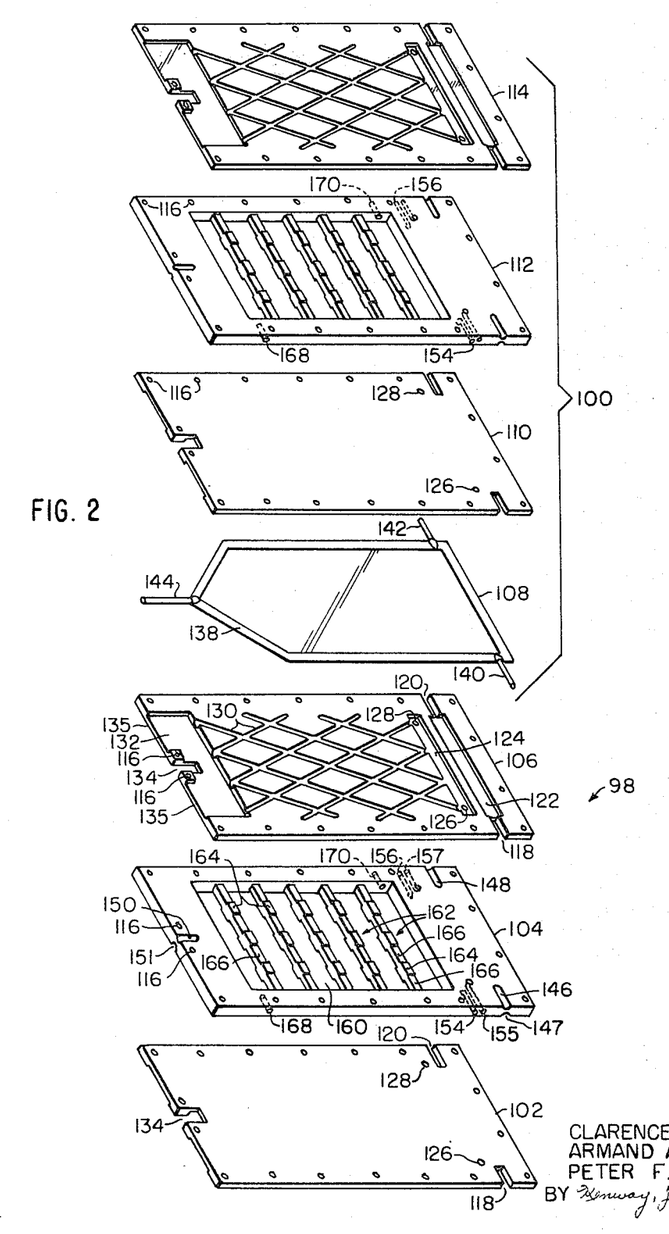
FIG. 2 is an exploded perspective view of a single stage pulsatile membrane blood oxygenator of our invention.

FIGURE 2 shows a perspective exploded view of a single stage membrane oxygenator 98 of our invention comprising a lower plate 102, a supporting frame 104, and upper plate 106, a membrane envelope 108, a lower plate 110, a supporting frame 112, and an upper plate 114. For simplicity and a reduction in component parts the plates 102, 106, 110, and 114 are essentially the same structural members.

The rigid rectangular lower and upper plates and supporting frames are characterized by a plurality of openings 116 near the circumference of the plates for the insertion of retaining and clamping bolts and wing nuts 16. The one or upper end of the rigid plate members is characterized by a pair of aligned slots 118 and 120 extending inwardly from each upper edge on the one or oxygen side to an elongated milled groove 122 which traversely extends across the top of one side of the plate, which deep groove serves as a blood inlet reservoir. Disposed slightly below this blood reservoir groove 122 and in a parallel arrangement is a similar oxygen reservoir milled groove 124 of about one-half less depth and which groove has oxygen inlet holes 126 and 128 drilled at each end of the groove 124. In contact with and extending downwardly from the groove 124 and throughout the remainder of the plate surface area of one side except for a peripheral edge area is a diamond shaped network of uniform angularly disposed recessed oxygen distributing grooves 130, the upper ends of which are open to the lower edge of the oxygen inlet reservoir 124 and the lower ends of the grooves open to a lower rectangular shaped recessed area 132 of decreased plate thickness. This recessed area 132 is characterized by a rectangular center slot 134 having on either side thereof a pair of bolt holding openings 116 in the original plate thickness. The faces of the plates 102, 106, 110, and 114 opposite the surfaces having the recesses 122, 124, 132, and the grooves 130 are planar, and present only the slotted apertures 118, 120, 34, and the bolt holes 116. (See plates 102 and 110.)

The recessed areas 132 including the elongated traverse open slot 135 at the end serves as an oxygenated blood collection zone for blood within the membrane envelope 108 and for the discharge to the atmosphere of excess or unused oxygen. The diamond shaped grooved network serves to and aids in rapidly dispersing the oxygen over the entire effective surface area of the upper plate 106 which is in flat engaging contact and clamped relationship with the membrane envelope 108. Although a plurality of uniform angularly disposed grooves forming a diamond shaped network is shown in this embodiment, any grooved distribution pattern such as a plurality of horizontal or vertical grooves in a rectangular pattern or even a scroll, spiral, etc., pattern may be employed which uniformly distributes or permits the rapid flow of the oxygen over the effective surface area of the upper plate 106 and provides communication between the oxygen reservoir zone 124 and the plate recessed discharge area 132.

A specific example of a suitable rigid rectangular plate 106 consists of a 1/16 of an inch aluminum sheet of 14 inches by 36 inches in size and having a relatively pressureless blood inlet reservoir groove 122 on the upper surface of about 1/64 of an inch deep by 1/2 of an inch wide along the top edge extending to within about an inch of each edge of the plate to provide a pressureless area for blood to rapidly traverse the entire width of the oxygenator plate. An oxygen reservoir groove 124 is provided just below and parallel to groove 122 which groove 124 is 1/32-inch deep by 1/2 of an inch wide to provide for an oxygen inlet reservoir and the rapid dispersal of oxygen across the width of the effective surface area of the membrane envelope 108. The diamond shaped groove network comprises grooves of approximately 1/16 of an inch wide by 1/64 of an inch deep to guide the oxygen flow over the effective surface areas of the plate 106 and membrane 108.

The membrane envelope 108 comprises an elongated sealed pentagonal fluid tight envelope bag formed by an upper and lower sheet of a gas pervious liquid impervious relatively thin plastic material. The two sheets of material are suitably sealed such as by heat sealing or taped together in a fluid tight manner about the circumference with standard autoclave masking tape 138. The membrane envelope 108 is provided at the base with individual blood inlet tubes 140 and 142, one on each side, one end of each tube being inserted in a fluid tight manner and sealed within the bag and the other end of each tube extending outwardly from a longitudinal side edge of the membrane. Each membrane envelope 108 also contains a blood outlet tube 144 at the apex of the pentagon, one end of which blood outlet tube is concealed within the bag and the other end of which extends outwardly from the apex.

The material from which a suitable membrane envelope is fabricated must have certain characteristics. It must be chemically and biologically inert. It must not have a sticky or adhesive quality, particularly with respect to adherence to itself. It is preferred that the maerial have a low fluid friction coefficient to facilitate gravity flow of blood through the envelope. It must have a high permeability for oxygen and carbon dioxide, and it preferably must be extremely thin while at the same time providing a minimum of leakage. It should have a relatively high mechanical durability including good resiliency and recovery following deformation. Particularly, it must have good structural integrity over prolonged periods of diffusion. Further, it is, of course, important that the material contain no abstractable additives which could contaminate the blood passing through the bag, and, of course, the bag must be suitable for good sealing at its edge portions. Also, the membrane material should be non-wettable so that it will not absorb blood constituents; it should provide a relatively constant rate of diffusion; it should be free of low molecular processing aids; and it should maintain a steady water balance with absence of pH alterations related to the "associated water activity" of wettable films. The term "membrane material" as related to the oxygenation of blood will be used hereinafter in the specification and claims to define a material having the above characteristics.

Suitable membrane material that may be employed in the fabrication of the membrane envelope of our invention includes, but are not limited to: Teflon, a tetrafluoroethylene polymer, polyethylene or Silastic (siliconerubber) films from about 0.0002" to 0.005" in thickness. These sheets are suitably sealed by autoclave tape extending circumferentially about the envelope, and closely adjacent to the peripheral edges, or the edges otherwise adhesively secured or bonded. The tape also serves as a resilient fluid tight sealing aid and spacer between the plates 106 and 110. A specific example of a membrane bag constructed and used in accordance with our invention comprises two layers of cast Teflon film of about 1/4 mil thickness and sealed by autoclave tape about the edge portions. The membrane envelope 108 is so spaced as to permit the outer edges thereof to be slightly inward of the bolt aperture holes 116 about the circumference of the lower and upper plates 102, 106, 110, and 114. Also the blood outlet tube 144 and the blood inlet tubes 140 and 142 are disposed in registry with slots 118, 120 and 134 in the plate member 106 and their mating slots in plate 110.

The supporting frame members 104 and 112 comprise a rigid rectangular frame characterized by peripheral aperture holes 116 for the insertion of holding bolts, said frame having milled semicircular upper and lower blood inlet grooves 146, 147 and 148, and blood outlet grooves 150 and 151, said grooves being in a vertical spatial arrangement in registry on either side of the frame members. The grooves provide for the proper clearance in a stacked condition for the blood inlet and blood outlet tubes 140, 142 and 144 of the membrane envelope 108. The frame is further characterized by two pairs of L shaped oxygen inlet conduits 154, 155, 156, and 157 disposed at the upper end of each frame 114 and 112, one end of each conduit opening to the outer edge of the frame and the other end disposed in registry with the oxygen conduits 126 and 128 of the plate 106 above it, while the other end of the lower oxygen inlet conduit is disposed in registry with the oxygen inlet conduit of the lower plate 102 thereby providing for the introduction of oxygen from the external source into the milled oxygen reservoir of the upper plate 106 or and if desired into the oxygen reservoir of a lower plate such as provided by the conduits 154 and 156 in plate 112 to conduits 126 and 128 in plate 110.

The frames 104 and 112 in registry with and above and below the grooved oxygen distribution pattern 130 of the plates 106 and 110 have an open rectangular section 160 containing a plurality of rigid horizontally disposed equally or uniformly spaced stepped cross-bar member 162. Each cross-bar member has a plurality of flat rectangular upper stepped areas 164 and flat rectangular lower stepped areas 166 on either side of each cross-bar member. Each of the upper stepped areas 164 has a predetermined stepped thickness slightly less than the thickness of the frame member 104 such as for example from 0.010 to 0.001 inch less than the total edge thickness of the frame on each side of the frame. These upper stepped areas provide a predetermined horizontal equally spaced supporting limitation on the lateral fluctuation of vertical spatial movement of the plate members 106 and 110 during the pulsation of the fluids and thereby aid in controlling and obtaining the desired thin blood film thickness in the envelope bag 108 and in inhibiting inward bowing of the rigid plate members 106 which would tend to cause film channeling and relatively thick blood films. The frame 104 has at its one or lower edge a heat exchange fluid inlet conduit 168 opening into the open section 160 and at the other or upper end of the open section a heat exchange outlet conduit 170. One end of each conduit is capable of being placed in communication with the external source of heat exchange fluid 72, the other end of each conduit being disposed within the open section 160 of the supporting frame 104. The lower steps 166 of the horizontal frame members 104 and 112 within the open section 160 may be of any desired size or thickness provided that they render sufficient structural support to the frame, and are of sufficient depth to readily permit the flow passage of the heat exchange fluid to be circulated from the inlet conduit 154 upwardly through the open areas of the stepped horizontal cross bar members 162 and outwardly through conduit 170.

In the single stage embodiment shown in FIGURE 2, the lower plate 102 only serves as a lower cover plate to confine the heat exchange fluid within the open section 160 of the supporting frame 104 while plate member 114 serves to confine the heat exchange fluid within the upper heat exchange supporting frame 112. As is apparent from the drawing additional stages may be readily added to this single stage unit by the incorporation of a four unit pack 100 comprising a membrane envelope 108, plate members 110 and 114 and a supporting frame 112.

A single stage unit as shown will provide efficient oxygenating capacity to serve the needs of a small infant, however, with adults four, eight or twelve or more stages may be required. A specific example of a supporting member frame constructed in accordance with our invention consisted of a 14-by-36-inch and ⅜-inch thick aluminum plate milled out to leave a rectangular frame with eleven equally spaced cross-bar members, each about ⅝ of an inch wide, with each cross-bar member in turn having four upper and four lower steps milled into it. Each upper step having a thickness of approximately 0.005″ less than the thickness of the aluminum plate.

Figure 3:
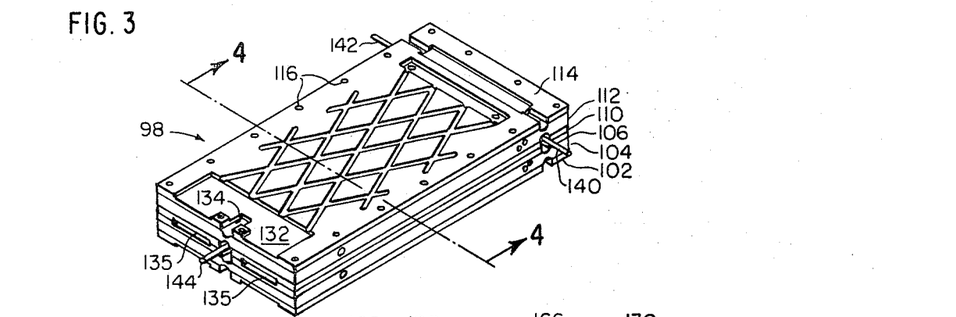
FIG. 3 is a perspective view of a single stage membrane blood oxygenator of our invention as is shown in FIG. 2 in an assembled stacked condition.

FIGURE 3 shows our oxygenator of FIGURE 2 in a vertical stacked unclamped condition in proper registry to permit the passage of bolts through the peripheral holes 116 of the plate members so that the plate members may be engaged in a clamped position by the use of wing nuts. The enclosed membrane envelope 108 in our single stage unit has the rigid plate members 110 and 106 with the distribution network against either side of the effective surface area of the membrane envelope and the blood and oxygen milled grooved reservoir areas 122 and 124 in registry. Frames 104 and 112 with open section 160 enclosed by plate members 102, 106, 110 and 114 respectively provide for an enclosed area for the circulation of a heat exchange fluid through these frames whereby a predetermined temperature of oxygenation can be maintained.

Figure 4:
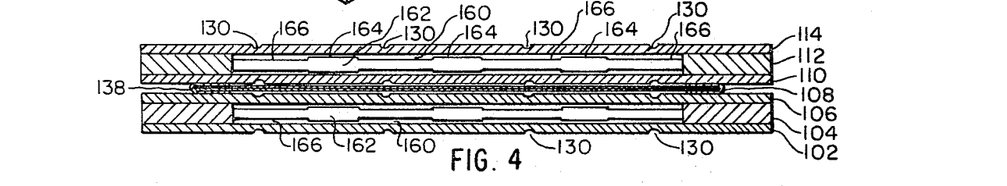
FIG. 4 is an enlarged cross sectional view along line 4—4 of FIG. 3.

FIGURE 4 shows an enlarged cross sectional view of our single stage oxygenator along the lines 4—4 of FIGURE 3, and shows, in particular, the relationship between the upper stepped areas 164 of the cross bar members 162 and the plate members 102, 106, 110 and 114. FIGURE 4 also shows the open areas provided between the lower stepped areas 166 through which the heat exchange fluid is caused to circulate. In the embodiment shown the plate members 110 and 106 are flexed by the pulsing oxygen in the oxygen distribution network groove 130 although the present embodiment makes the addition of other sets 100 to increase the oxygenation capacity of our assembly readily possible. The extent of and use of conventional solid rectangular upper and lower cover plate members such as 12 and 14 in FIGURE 1 is avoided and fabrication simplified by the interchangeability of the rigid plate members so that plate members 102 and 114 while not in contact with the membrane in this embodiment, serve only as the upper and lower cover plates for the frame members 112 and 104. FIGURE 4 also illustrates the placement of the membrane envelope 108 between the plate members 106 and 110 with the outer rectangular or straight line upper portion edges of the membrane envelope sealed by autoclave tape 138 forming a fluid tight seal between plate members 106 and 110. A gas tight seal is desirable between the upper three sides of the plate members 106 and 110 in order to confine the pressurized gas within the gaseous distribution pattern 130, while the lower end 135 is not sealed with the membrane edges to permit unused or excessive gas to be discharged to the atmosphere as shown or to an external collecting zone.

The recessed areas 132 of the plates 106 and 110 of this embodiment of our invention in FIGURES 1 through 4 provide a hidden lower reservoir for arterial blood in the envelope 108. However, it is often desired and advantageous for the operator or physician to be apprized of the amount, color and flow rate of the arterial blood into the blood reservoir of the envelope.

Figure 5:
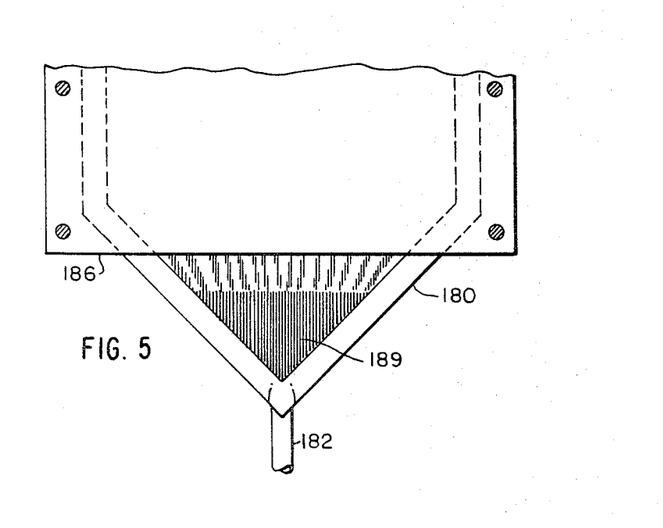
FIG. 5 is a fragmentary enlarged top plan view of a particular disposition of the membrane envelope.

FIGURE 5 shows a modified oxygenator of our invention in which an elongated pentagonal membrane envelope 180 is used, the rectangular portion thereof being of approximately the same or slightly less than the upper and lower plate members and which membrane has an apex extending outwardly from the bottom of the plate members and beyond the recessed area of the plate members which apex contains a blood outlet tube 182. This outwardly extended apex provides a visible arterial blood reservoir 184 outside of the lower end of the upper plate members 186. This embodiment also permits the use of a greater portion of the grooved recessed oxygen distribution surface area of the plate members, since the recessed area at the one or lower end of the plate 132 may be made considerably smaller and the inwardly extended slot 134 eliminated since the blood outlet tube is external of the oxygenator.

In the operation of our invention venous blood from an external blood supply 36 is pumped by a single roller peristaltic type pump 38 through a main blood inlet conduit 37 to conduits 40 and 42 a first and second manifold 44 and 46 into individual blood inlet tubes 140 and 142 where the blood forms a relatively pressureless venous blood reservoir within the membrane envelope 108 in the milled blood reservoir zone 122. During the oxygenation process our oxygenator 10 may be tilted in any direction and if desired may be employed in a vertical manner as shown in FIGURE 1 in order that gravity may assist in processing the blood through the oxygenator. Blood may be introduced into the blood inlet tubes 140 and 142 in a continuous manner by gravity alone or as described, by an intermittent or pulsating pumping with gravity flow of the blood to the blood inlet reservoir 122. Pulsing of the blood alone fails to attain all the objects of our invention, since if blood is intermittently pumped diffusion rapidly falls off as the blood progresses through the plate and membrane area due to the formation of relatively thick blood film, stationary blood boundary layers on the membrane surfaces and a relatively constant gaseous pressure difference within and without the envelope.

Oxygen is introduced into our multistage oxygenator from an oxygen tank 52 through an oxygen inlet conduit 54 containing a needle valve 56 and an electrically operated solenoid valve 58 in communication with a multicam electric timer 60 which timer provides for a pulse rate of approximately 60 pulses per minute of oxygen through the conduits 64 and 62 into the first and second oxygen manifold 68 and 70 and to individual oxygen inlet conduits 155 and 157 in frame 104 and conduits 154 and 156 in frame 112. In this manner oxygen with a pressure of approximately 8 to 12 p.s.i.g. is introduced into the oxygen inlet reservoir area 124 from whence it rapidly is dispersed by the diamond shaped network 130 of plates 106 and 110 throughout both sides of the surface area of the membrane envelope 108 with excess or unused oxygen dissipated through the openings of the diamond network into the recessed area 132 thence through slot 135 to the atmosphere. As described oxygen is employed on both sides of the membrane surface, however, where desired oxygen may be pulsed on one side alone or on both sides, and at different pulse rates in or out of phase.

If desired oxygenation may be accomplished at a predetermined temperature by the circulation of a heat exchange fluid such as water. The water of the desired temperature is introduced through an inlet conduit 86 to a heat exchange manifold 84 thence to an individual inlet conduit 164 where it is drawn upwardly and through the open areas of the lower steps 166 of the stepped cross bar members 162 and through the open area 160 of the frames 104 and 106 and outwardly through the heat exchange outlet conduits 170 to the manifold 82 and outlet conduit 80. It is preferred that the heat exchange fluid be circulated in a rather continuous smooth manner upwardly in a counter-current direction to the flow of the blood and the oxygen in the oxygenator, that is by employing a negative pressure to the outlet conduit 170. The employment of positive pressures in an attempt to pump the heat exchange fluid upwardly through conduit 86 or in a cocurrent direction with the blood through conduit 80 is not preferred due to the creation of positive pressures within the open area 160 of the frame members 104 and 112 which pressures have a tendency to push the plate members 102, 106, 110, and 114 outwardly in a manner which inhibits the pulsation of the oxygen and plate members and thereby impedes the efficient oxygenation of the blood.

As the blood flows downwardly in our oxygenator the pulsation of the oxygen creates intermittently very thin blood films within the membrane envelope 108 and maximum pressure difference between the oxygen in the network distribution system 130 and the partial pressure of the oxygen in the blood within the envelope 108 during the relatively high pressure portion of the oxygen pulse cycle period. The blood within the membrane envelope 108 is induced to flow within the envelope during the positive oxygen pressure pulses, since the membrane layers collapse by the force of the oxygen pressure, an internal membrane mechanical peristaltic action takes place which provides a continual fresh blood surface on the membrane simultaneous with providing fresh pressurized oxygen with each oxygen pulsation. Thus pulsation of the oxygen maximizes oxygen pressure differences inside and outside the membrane, creates a relatively thin membrane blood film and induces continual fresh blood and oxygen surfaces thereby greatly enhancing the efficiency and rapidity of oxygenating the venous blood. As the oxygen or blood and oxygen are pulsed the plate members are permitted to move a predetermined inward distance limited by the predetermined upper stepped areas of the cross bar members which inhibit undue bowing and blood channeling.

We have found that the membrane envelopes have an ability to withstand prolonged periods of pulsatile pumping, and that the pulsing of the oxygen or the gas phase alone or in combination with the blood is vastly superior to the pulsation to the blood alone. Although pulsation of the oxygen alone provide excellent oxlgenation, pumping of the blood and the oxygen phases together in or out of phase will take advantage of both the compressibility of the gas phase, that is the oxygen and the noncompressibility of the liquid phase, that is the blood. In the operation of our oxygenator, the gaseous phase is rapidly dissipated in order to provide relatively true high and low pressure oxygen fluctuating effects. Rapid dissipation of the oxygen is provided by the diamond shaped network 130 on the plate member surfaces and the discharge of the excess oxygen to the recessed area 132 and through slotted area 135 to the atmosphere. The blood flow rates of 100 to 800 cc.'s per minute and oxygen pulsation of 8 to 60 per minute at oxygen pressures of 8 to 12 pounds p.s.i. blood film pressures within the membrane envelope have ranged from 10 to 140 millimeters of mercury. Each stage of the specific embodiment of our oxygenator can provide up to approximately 320 millimeters of blood per minute and at lest 95% oxygen saturated arterial blood. A 12-stage unit is, therefore, normally sufficient for use in the adult human in a total bypass system. Where desired to enhance efficiency or to promote better contact of the gas and the liquid, or for other reasons, the gas pressure may be varied (e.g., 1–100 p.s.i. or higher). The rate of gas pulsation may be lower or higher than that described such as from 4 to 160 pulses per minute. As the blood passes downwardly in our oxygenator and becomes fully saturated in the internal membrane envelope system shown in FIGURES 1 through 4, the arterial blood collects within the membrane in the recessed area 132 and flows out the blood outlet tube 144 to a manifold 48, thence to a main blood outlet conduit 50 to a blood pump, a collective reservoir, or directly to a patient.

We have, therefore, provided an improved membrane oxygenator which very closely approaches the functional action of a human lung and which provides for a superior exchange of gases per unit membrane surface area. In the operation of our oxygenator, the oxygen alone may be pulsated or the blood and oxygene pulsated and if desired out of phase pulsation of the heat exchange fluid may be employed to induce the peristaltic flow of blood in the membrane envelope. Air, oxygen, and mixtures thereof as well as liquids such as saturated saline or glucose solutions can be used for oxygenation by our pulsing method and apparatus. Our oxygenator creates desirable conditions for the oxygenation of blood and changes may be made in the construction and the different embodiments of our invention without departing of the scope thereof. For example, changes may be made in the particular oxygenator distribution network and the blood may be introduced at the one end of the oxygenator to provide for counter-current flow of the oxygen to the blood flow.

Modifications may also be made within the scope of our invention through the means of clamping or securing the plate members' frame and membrane envelope in a stacked relationship.

Figure 6:
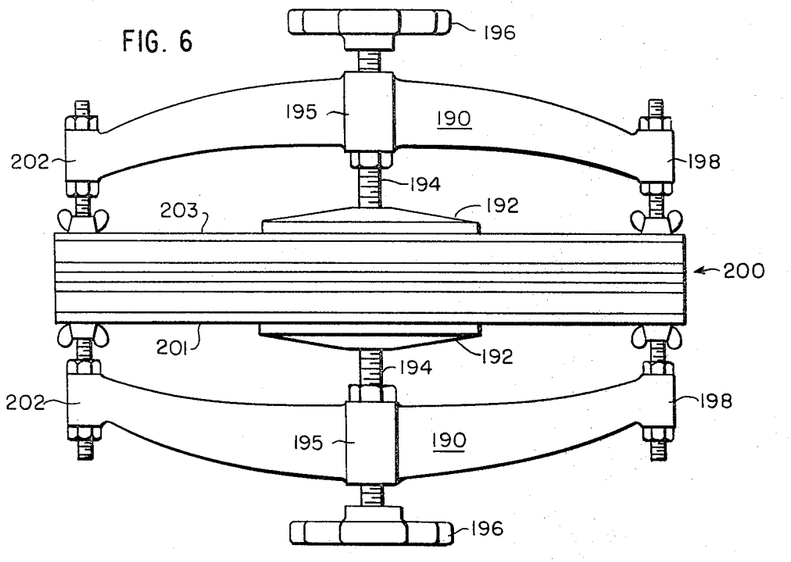
FIG. 6 is an end view of our membrane apparatus with a clamping assembly.

FIGURE 6 shows a plurality of membrane, plate, and frame elements 200 in a stacked relationship as described in our blood oxygenator of FIGURES 1 and 3. The outer surfaces 201 and 203 of the lower and upper plate members are limited in their outward displacement during fluid pulsations by one or more yoke clamping assemblies laterally disposed above and across each outer surface. The clamping assembly comprises: an arched frame 190, and a jack screw thread 194 extending through a central boss 195 in the frame, having at the one end a lower pressure plate 192 and at the other end a manual pressure adjusting knob 196. The frame is secured to and laterally across the outer plate surfaces by lug sleeves 198 and 202 at either end of the frame which sleeves are secured to the stacked plate members by extending the peripheral bolts through the lug sleeves 198 and 200 and securing the bolts with nuts. We have found that three of these clamping assemblies uniformly disposed across each outer surface of the plate members of our oxygenator are quite effective in limiting the outward movement of the outer plate members and thereby enables an adjustment in the compressive engagement between the stacked members to be made. As the outer plate surfaces are limited in their outward displacement movement and brought into a greater compressive engagement with the stacked members extremely thin blood films are possible within the membrane envelope. The clamping assembly shown provides for a predetermined clamping pressure to be placed on the surface of the outer plate members. The outward limitation placed on the outer plate members by this clamping assembly provides for the quick positive return of the plate members to their nonpulsing position.

When the fluid pulse is at the relatively high pressure the plates are forced tensionally outwardly against the pressure plates 192 of the clamping assembly and upon cessation of the fluid pulse the plates snap back quickly into a neutral position. As discussed previously, the stacked plates with pulsation will also serve as a peristaltic blood pump, since with valved one way inlet and outlet blood conduits the flexing action of the plates especially with the clamping assembly provides excellent pumping action on the fluid enclosed within the membrane envelope. Where adjustment of the compressive pressure on the outer plates is not of importance a yoke member composed of tensional or spring metal of predetermined tensional characteristics may be employed, so that as the outer surface of the plate is flexed outwardly the yoke member increases its compressive inward force against the plate surface.

Figure 7:
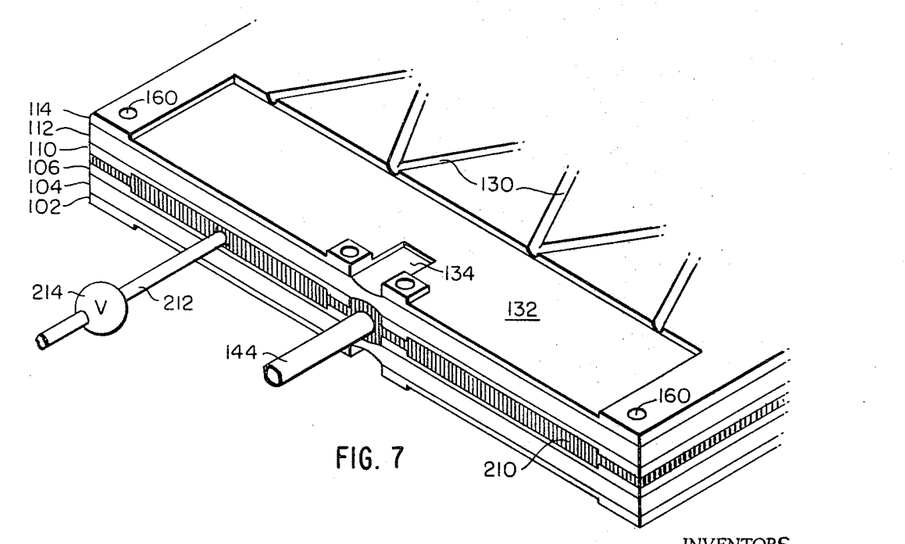
FIG. 7 is an enlarged perspective view of a modified membrane apparatus.

FIGURE 7 shows a perspective view of a modified apparatus of the single stage pulsatile membrane assembly of FIGURE 3 wherein the elongated slot 135 created by the stacked relationship of plates 106 and 110 and through which slot excess oxygen is permitted to be discharged to the atmosphere, is sealed with an adhering rubbery fluid-tight sealing or gasketing material 210. This gasketing material also extends inwardly about the edges of the lower portion of plate members 106 and 110 to the sealing edges of the membrane envelope 108 where it slops inwardly toward the blood reservoir area 132. Additionally, gasketing material is placed about the blood outlet tube 144 in the slot created by the mating of slots 134 of plates 106 and 110 to provide for a fluid tight seal of the blood outlet tube 144, and of the plate members 106 and 110. Extending outwardly from the gasketed slot 135 and sealed in the gasket material 210 is a discharge tube 212, one end of which is located within the internal blood reservoir area 132, and the other end of which opens to the atmosphere as shown or if desired to a fluid or oxygen purification and recovery apparatus or even to a sub-atmospheric region. The tube 212 contains a pop off type valve 214 such as a spring loaded fluid flow valve which opens at an upper predetermined fluid pressure level and closes at a predetermined lower fluid pressure level or whose structure is sufficiently large enough or closing action time period long enough to enable the fluid being discharged such as oxygen within the single stage membrane assembly to be rapidly discharged to a desirable low predetermined level such as the atmosphere.

This modified apparatus permits our oxygenator to be even more effective in oxygenating blood, and to be more effective as an artificial kidney in liquid-liquid exchanges. The sealing of the oxygen within the apparatus during the high pressure pulse period by the gasketing material 210 permits very thin blood film to be created in the membrane envelope, thereby minimizing the trapped blood volume and permitting extremely rapid oxygenation or even super oxygen saturation of the blood or other fluid. For example, where a limited amount of a very rare type blood must be oxygenated this modified apparatus can be first primed with a glucose-water solution, and then operated so that very thin blood film, low trapped blood volumes and high oxygenation levels are accomplished. In operation when the oxygen pressure reaches the predetermined high level such as just before or at the relatively high level of the oxygen source being pulsed, the pop off valve 214 is selected to open at or just below this pressure to permit the rapid discharge of the unused oxygen. When all or most of the oxygen or a predetermined amount of the oxygen has been discharged through conduit 212 and valve 214, the pop off valve 214 closes as the next relatively high pressure oxygen pulse is introduced between the plate members. This sequential timed opening and closing action of the valves like the clamping assembly to retain the oxygen within the apparatus to provide a more rapid build up of oxygen pressure and tends to give good flexing action to the plate members. The plate members can be provided with sealing inserts for the elongated slots 135 or may be initially constructed to provide for a full circumferential sealing of the plate edges by the elimination of the slot 135, the use of rectangular membrane envelopes and providing a tight sealing of the blood outlet tube 144. But, this arrangement does not permit the apparatus to have a variety of functions. Where desired, the individual tubes 212 can be valved to a single manifold containing a single fluid pop-off valve or one or a series of solenoid operated valves can be employed which open and close in response to a timer which opens the valve just before or at the high pressure pulse and closes the valve after a predetermined timed interval or a predetermined pressure level. For example, separate timer can be provided or the solenoid pop off valves made electrically responsive to timer 60.

Further, some adjustment in compressive engagement between plate member and the blood film in the envelope can be accomplished by adjusting the peripheral wing nuts to provide for a tightly clamped stacked relationship of the elements. By tightly clamping these elements the rigidity of the stacked members will be enhanced and will permit fluid or oxygen pressures as low as one to two pounds be successively employed in oxygenating blood.

It is also recognized that our oxygenator may be employed as an artificial kidney to remove by membrane diffusion means through the same or different preselected semipermeable membrane layers, undesirable components in the liquid phase within the membrane envelope either by having the undesirable components pass through the semipermeable membrane or to be selectively retained within the membrane.

Our apparatus may be employed as an artificial kidney by providing within and without the membrane envelope fluids of high and relatively low concentration whereby one or a series of molecules or ions in the higher concentration fluid is permitted to pass through a semipermeable or diffusion membrane to the lower concentration fluid. For example, a liquid high in urea, sodium content, heavy metals or organic or inorganic deleterious substances within the membrane envelope may be dialyzed through the membrane into a liquid solution or a gas saturated liquid solution or even a gas outside the envelope. The fluid outside the envelope can be pulsed in the manner previously discussed. Thus by pulsations within the pulsatile membrane apparatus described, the rapid exchange of ions and molecules is accomplished. The liquid pulsed outside the membrane envelope, while not as compressible as a gas, due to a two to one surface ratio of the outside liquid within the membrane envelope, liquid pulsations are effected enhancing the ion or gaseous exchange. When diffusion between a liquid-liquid is employed, other membrane materials such as cellophane 300, polyethylene, polypropylene, rubber and other natural and synthetic dialyzing and diffusing film membrane materials can be employed. The selection of each membrane material depends upon the ions or molecules to be separated. With the control of the temperature within the membrane apparatus or the circulation of a heat exchange fluid diffusion can be accomplished at any desired temperature, therefore, the apparatus may readily be employed as an artificial kidney.

Additionally, although our invention has been described with particular reference to blood in the liquid phase and oxygen as a gaseous stage it is apparent that those skilled in the art that this apparatus and method may be employed in any fluid exchange such as gas-liquid, gas-gas, or liquid-liquid exchange through a selected semipermeable membrane. For example, our apparatus will permit the efficient oxygenation, hydrogenation, halogenation, sulfonation, and the like of a wide variety of organic or inorganic liquids, gases, or slurries.

It is to be understood that the language in the following claims is intended to cover all general and specific features of the invention herein described and all statements of the scope of the invention to the broadest extent that the prior art permits.

What we claim is:

1. A multiple stage flat press type membrane apparatus which comprises in combination a plurality of stacked flat units disposed in a stacked relationship between cover members each unit comprising:

a membrane envelope including a first inlet and first outlet means to introduce into and withdraw from the envelope a first fluid;

a pair of plate members disposed adjacent to either surface of the membrane envelope, at least one of the plate members including a displaceable section adjacent to the surface of the membrane envelope;

second inlet means and second outlet means to introduce and withdraw from between the displaceable section of the plate member and the adjacent surface of the envelope a second fluid;

means to hold and support the plate member and membrane envelope in a flat stacked relationship; and means to control the displacement of the displaceable section of the plate member a predetermined amount away from the adjacent surface of the membrane envelope upon the introduction of the second fluid.

2. A membrane apparatus as described in claim 1 in which in each unit the displaceable section of the plate member is characterized by recessed second fluid distribution means extending substantially over the displaceable plate surface adjacent the surface of the membrane envelope and the apparatus includes means in fluid flow communication with the distribution means to connect the distribution means with the second inlet means.

3. The apparatus as described in claim 1 in which each unit includes means to place the plate member and membrane envelope in peripheral fluid tight compressive engagement thereby forming a fluid tight chamber and means to reduce the pressure of the second fluid to a predetermined low pressure when the second fluid introduced into the chamber reaches a predetermined relatively high pressure.

4. A membrane apparatus as described in claim 1 in which in each unit the displaceable section of the plate member has a surface adjacent the envelope surface characterized by a recessed fluid reservoir groove extending traversely across at least one end of the plate member a substantial distance; and recessed distribution means extending substantially over the surface of the displaceable section of the plate adjacent the envelope surface and the unit includes means to connect the second inlet means in fluid flow communication with the fluid reservoir.

5. A membrane apparatus as described in claim 1 in which each unit includes a support frame on which the displaceable plate member is mounted, the support frame containing means therein disposed adjacent the plate on the side opposite the envelope and in spaced relation thereto to limit the displacement of the displaceable section of the plate a predetermined distance away from the surface of the membrane envelope upon the introduction of the second fluid.

6. A membrane apparatus as described in claim 1 which includes in each unit means for introducing a heat exchange fluid into contact with at least one plate member on the surface opposite to that surface adjacent the membrane envelope.

7. A pulsatile membrane apparatus which includes in combination:
  a plurality of stacked flat units disposed in a stacked relationship between cover members each unit comprising:
  a membrane envelope including a first inlet and first outlet means to introduce into and withdraw from the envelope a first fluid;
  a pair of plate members disposed adjacent to either surface of the membrane envelope, at least one of the plate members including a displaceable section adjacent the surface of the membrane envelope;
  second inlet means and second outlet means to introduce and withdraw from between the displaceable section of the plate member and the adjacent surface of the envelope a second fluid;
  means to hold and support the plate member and membrane envelope in a flat stacked relationship;
  means to control the displacement of the displaceable section of the plate member a predetermined amount away from the adjacent surface of the membrane envelope upon the introduction of the second fluid;
  a source of first fluid;
  a source of second fluid;
  means in communication with the first inlet means to connect the first inlet means to the first source;
  means in communication with the second inlet means to connect the second inlet means to the second source; and
  second fluid pulsating means to introduce the second fluid from the second source into the second inlet means in an intermittent pulsating manner.

8. A pulsatile membrane apparatus as described in claim 7 wherein
  the means to place the source of first fluid in fluid flow communication with the first inlet means includes unidirectional flow means to permit the first fluid to be introduced in the envelope;
  and the first outlet means includes unidirectional flow means to permit the first fluid to be withdrawn from the envelope.

9. A pulsatile membrane apparatus as described in claim 7 in which the source of first fluid is a source of blood to be oxygenated and the source of second fluid is a gas capable of oxidizing the blood of the first source.

10. A pulsatile membrane apparatus as described in claim 7 wherein the second fluid pulsating means includes a subatmospheric pressure source.

11. A pulsatile membrane apparatus as described in claim 7 in which each unit includes:
  a plate member having a surface adjacent the envelope surface characterized by a recessed fluid reservoir groove extending traversely across at least one end of the plate member a substantial distance;
  recessed distribution means extending substantially over the surface of the displaceable section of the plate adjacent the envelope surface; and
  means to connect the second inlet means in fluid flow communication with the fluid reservoir.

12. A pulsatile membrane apparatus as described in claim 7 in which each unit includes:
  a support frame on which the displaceable plate member is mounted;
  the support frame containing means disposed adjacent the plate on the side opposite the envelope and in spaced relation to the plate to limit the displacement of the displaceable section of the plate a predetermined distance away from the surface of the membrane envelope upon the introduction of the second fluid.

13. A single stage flat press-type membrane apparatus which comprises in combination:
  a membrane envelope including a first inlet and first outlet means to introduct into and withdraw from the envelope a first fluid;
  a pair of plate members disposed adjacent to either surface of the membrane envelope, at least one of the plate members including a displaceable section adjacent the surface of the membrane envelope;
  second inlet means and second outlet means to introduce and withdraw from between the displaceable section of the plate member and the adjacent surface of the envelope a second fluid;
  means to hold and support the plate member and membrane envelope in a flat stacked relationship, which includes a support frame containing a plurality of spaced cross bar members within the frame to control the displacement of the displaceable section of the plate a predetermined amount away from the adjacent surface of the membrane envelope upon the introduction of the second fluid.

14. A member apparatus as described in claim 13 wherein the cross bar members extend traversely of the frame and contain a plurality of steps disposed in a predetermined spaced relation to the displaceable portion of the plate member.

15. A membrane apparatus as described in claim 13 wherein the frame is characterized by a fluid tight chamber and inlet and outlet means to introduce into and withdraw from the chamber a heat exchange fluid, the chamber being in a heat exchange relationship with the surface of the displaceable plate member opposite the envelope.

16. A membrane apparatus as described in claim 13 wherein the displaceable plate member is characterized by a recessed fluid reservoir groove extending traversely across the one end of the plate member and by interecting obliquely disposed recessed channels on the plate surface extending substantially over the surface of the displaceable section of the plate member adjacent the envelope surface, one end of the channels being in fluid flow communication with the recessed reservoir and means to connect the second inlet means in fluid flow communication with the recessed reservoir.

17. A single-stage, flat, press-type membrane apparatus which comprises in combination:
   a membrane envelope including first inlet and first outlet means to introduce into and withdraw from the envelope a first fluid;
   spaced plate members disposed on adjacent sides of the membrane envelope, at least one of the plate members being displaceable outwardly from the adjacent surface of the envelope upon the introduction of a second fluid and having a surface characterized by recessed fluid reservoir groove means extending traversely across the plate member a substantial distance and recessed distribution channels extending substantially over the surface of the plate adjacent the envelope surface and which are in fluid flow communication with the fluid reservoir groove means;
   means to exhaust excess second fluid from the region between the displaceable plate member and the envelope;
   means to introduce the second fluid into the fluid reservoir groove means of the plate;
   a support frame on which the displaceable plate is mounted, the frame including a plurality of cross bar members extending traversely of the frame, each member having a plurality of steps being spaced from the plate a predetermined distance to limit the displacement of the plate member upon the introduction of a second fluid.

18. A single-stage, flat, press-type oxygenator apparatus which comprises in combination:
   a fluid tight blood membrane envelope including blood inlet and blood outlet means to introduce into and withdraw from the envelope blood to be oxygenated;
   spaced, displaceable plate members disposed on either side of the envelope; each plate member having a surface adjacent the envelope surface characterized at the one end by an elongated recessed inlet reservoir, at the other end by a recessed outlet reservoir, the inlet reservoirs on facing plates being in facing registry and the outlet reservoirs on facing plates being in facing registry, recessed oxygen distribution channels extending over a substantial surface area of the plate member adjacent the envelope and in fluid flow communication at the one end with the oxygen inlet reservoir;
   means to permit the discharge of excess oxygen from the apparatus;
   means to introduce oxygen into the oxygen inlet reservoir;
   support frames on which each displaceable plate member is mounted, the frame including a plurality of cross bar members within the support frame, each member being spaced from the plate a predetermined distance to permit limited displacement of the plate member away from the adjacent surface of the envelope upon introduction of oxygen into the inlet reservoir and distribution channels; and
   means to engage the plate members, frames, and envelopes in registry in a compressive engagement at the margins thereof.

19. A pulsatile blood oxygenator which comprises in combination;
   a fluid tight blood membrane envelope including blood inlet and blood outlet means to introduce into and withdraw from the envelope blood to be oxygenated;
   spaced, displaceable plate members disposed on either side of the envelope; each plate member having a surface adjacent the envelope surface characterized at the one end by an elongated recessed inlet reservoir, at the other end by a recessed outlet reservoir, the inlet reservoirs on facing plates being in facing registry and the outlet reservoirs on facing plates being in facing registry, recessed oxygen distribution channels extending over a substantial surface area of the plate member adjacent the envelope and in fluid flow communication at the one end with the oxygen inlet reservoir;
   means to permit the discharge of excess oxygen from the apparatus;
   means to introduce oxygen into the oxygen inlet reservoir;
   support frames on which each displaceable plate member is mounted, the frame including a plurality of cross bar members within the support frame, each member being spaced from the plate a predetermined distance to permit limited displacement of the plate member away from the adjacent surface of the envelope upon introduction of oxygen into the inlet reservoir and distribution channels;
   means to engage the plate members, frames, and envelopes in registry in a compressive engagement at the margins thereof;
   a source of blood to be oxygenated;
   a source of oxygen;
   means connecting the blood inlet means in fluid flow communications with the source of blood; and
   means connecting the oxygen inlet means in fluid flow communication with the source of oxygen including a flow control valve and a means to actuate the valve in a periodic timed manner.

20. A blood oxygenator apparatus as described in claim 18 in which the distribution channels include intersecting obliquely disposed recessed channels on the plate surface.

21. A blood oxygenator apparatus as described in claim 18 wherein at least one support frame is characterized by a fluid tight chamber in which the displaceable plate member forms at least a portion of one side thereof, and inlet and outlet means to introduce and to withdraw a heat exchange fluid into and out of the chamber whereby the plate member is placed in a heat exchange relationship with the heat exchange fluid.

22. A blood oxygenator apparatus as described in claim 21 which includes:
   a source of heat exchange fluid; and
   means to place the source in fluid flow communication with the inlet means including flow control means and means to actuate the control means in a periodic timed manner.

23. A blood oxygenator apparatus as described in claim 18 wherein the means to introduce the blood into the envelope includes a check valve and the means to withdraw the blood from the blood outlet includes a check valve.

24. A blood oxygenator as described in claim 19 wherein means to discharge the excess oxygen includes a valve which opens at a predetermined high pressure and closes at a predetermined low pressure.

25. An article of manufacture comprising:
   a support frame;
   a displaceable flat plate member marginally secured to the support frame;
   means connected to the support frame and disposed adjacent to the plate member on the opposite side thereof and in spaced relation thereto to limit the displacement of the plate member inwardly a predetermined distance, the plate member having the outward surface characterized by an elongated recessed groove at the one end and extending substantially across the plate surface and recessed distribution channels extending from the recessed groove in a predetermined pattern over a substantial portion of the plate surface; and
   means to introduce a fluid into the recessed groove.

26. An article of manufacture as described in claim 25 wherein the means to limit the displacement of the displaceable plate member include a crossbar member having a plurality of stepped areas of predetermined height within the support frame, each stepped area being spaced from the plate a predetermined distance to permit limited inward displacement of the plate member.

27. An article of manufacture comprising:
   a generally rectangular support frame;
   upper and lower flat plate members marginally secured to the support frame at least one of the plate members having an outwardly disposed displaceable surface characterized by an elongated recessed groove at the one end and extending substantially across the plate surface and recessed distribution channels extending from the recessed groove in a predetermined pattern over a substantial portion of the plate surface;
   means to introduce a fluid into the recessed groove; and
   means disposed within the support frame and adjacent to the displaceable plate to limit the inward displacement of the plate member a predetermined amount.

28. An article as described in claim 27 wherein the means within the support frame to limit the inward displacement of each displaceable plate member includes a plurality of crossbar members extending traversely of the frame, each member having stepped portions spaced from the plane of the frame a predetermined distance to permit limited inward displacement of the plate member.

29. An article as described in claim 27 wherein the recessed distribution means includes obliquely disposed intersecting recessed channels and the plate member is further characterized at the other end by a marginal recessed reservoir area.

30. An article of manufacture comprising:
   a generally rectangular rigid support frame;
   upper and lower displaceable flat plate members secured to the support frame to provide a fluid tight chamber therein;
   each plate member having an outward surface characterized by a recessed inlet fluid reservoir groove at the one end and extending substantially across the plate surface, a marginal recessed reservoir area at the other end of the plate surface, and recessed distribution channels extending across a substantial portion of the plate surface connected in fluid flow communication at the one end with the inlet fluid reservoir and at the other end with the recessed reservoir;
   means within the support frame including stepped crossbar members extending across the frame, each member having a plurality of stepped areas of predetermined height, which height is selected to limit the inward displacement of each plate member a predetermined amount;
   means to introduce a fluid into the inlet reservoir groove; and
   means to introduce into and withdraw from the fluid-tight chamber a heat exchange fluid.

References Cited
UNITED STATES PATENTS

| | | | |
|---|---|---|---|
| 1,849,622 | 3/1932 | Heibig | 210—321 X |
| 2,407,303 | 9/1946 | Teale | 210—229 |
| 2,568,990 | 9/1951 | Daniel | 210—8.5 |
| 2,652,831 | 9/1953 | Chesler | 128—214 |
| 3,034,505 | 5/1962 | Sobol | 128—214 |
| 3,060,934 | 10/1962 | Claff et al. | 128—214 |
| 3,074,559 | 1/1963 | Savino | 128—214 X |
| 3,212,498 | 10/1965 | McKirdy | 128—214 |
| 3,255,816 | 1/1966 | Rosenblad | 165—166 |

OTHER REFERENCES

Clowes et al.: "An Artificial Lung Dependent Upon Diffusion of Oxygen and Carbon Dioxide through Plastic Membranes," from Journal of Thoracic Surgery, vol. 32, No. 5, November 1956, pp. 630–37.

RICHARD A. GAUDET, *Primary Examiner.*

D. L. TRULUCK, *Assistant Examiner.*